United States Patent
Raya et al.

(10) Patent No.: US 12,220,941 B2
(45) Date of Patent: Feb. 11, 2025

(54) AXLE ASSEMBLY HAVING A WHEEL END ASSEMBLY AND A GEAR REDUCTION UNIT

(71) Applicant: ArvinMeritor Technology, LLC, Troy, MI (US)

(72) Inventors: Dhanapal Vittala Raya, Troy, MI (US); Aneesh N. Singaran, Bangalore (IN); Chandrakant Kotagi, Bangalore (IN)

(73) Assignee: ArvinMeritor Technology, LLC, Troy, MI (US)

( * ) Notice: Subject to any disclaimer, the term of this patent is extended or adjusted under 35 U.S.C. 154(b) by 322 days.

(21) Appl. No.: 17/903,452

(22) Filed: Sep. 6, 2022

(65) Prior Publication Data

US 2024/0025206 A1    Jan. 25, 2024

(30) Foreign Application Priority Data

Jul. 20, 2022 (IN) .............................. 202211041460

(51) Int. Cl.
*B60K 17/04* (2006.01)
*B60B 27/00* (2006.01)
*F16H 1/28* (2006.01)

(52) U.S. Cl.
CPC ........ *B60B 27/0021* (2013.01); *B60K 17/046* (2013.01); *F16H 1/2854* (2013.01)

(58) Field of Classification Search
CPC . B60B 27/0021; B60B 35/125; B60K 17/046; F16H 1/2854; F16H 57/082
See application file for complete search history.

(56) References Cited

U.S. PATENT DOCUMENTS

| | | | |
|---|---|---|---|
| 1,627,196 A * | 5/1927 | Ovren ................... | B60K 17/046 |
| | | | 475/308 |
| 6,719,028 B2 * | 4/2004 | D'Amico .......... | B60C 23/00318 |
| | | | 180/385 |
| 8,398,520 B1 | 3/2013 | Bassi et al. | |
| 8,608,608 B1 * | 12/2013 | Simpkins .............. | F16H 1/2854 |
| | | | 475/230 |
| 9,279,490 B2 * | 3/2016 | Hirao ..................... | B60K 17/16 |
| 9,410,605 B2 | 8/2016 | Kluck | |
| 9,506,549 B2 | 11/2016 | Chandrashekar et al. | |
| 9,719,563 B2 | 8/2017 | Hirao | |
| 9,816,603 B2 | 11/2017 | Hayes et al. | |
| 10,113,628 B2 | 10/2018 | Kluck et al. | |

(Continued)

FOREIGN PATENT DOCUMENTS

DE    2027398 A1 *   12/1971
DE    2338193 A1 *    2/1975

(Continued)

OTHER PUBLICATIONS

Extended European Search Report dated May 16, 2023 for related European Appln. No. 22204758.1; 13 Pages.

*Primary Examiner* — Sherry L Estremsky
(74) *Attorney, Agent, or Firm* — Brooks Kushman PC

(57) ABSTRACT

An axle assembly having a spindle, an axle shaft, and a wheel end assembly. The wheel end assembly includes a hub and a gear reduction unit. The gear reduction unit includes first and second side gears, a case, and a pinion gear that is rotatably disposed on a pinion pin. The case is rotatable with the hub.

20 Claims, 7 Drawing Sheets

(56) References Cited

U.S. PATENT DOCUMENTS

| | | |
|---|---|---|
| 10,156,289 B2 | 12/2018 | De Stefani et al. |
| 10,208,846 B2 | 2/2019 | Chinitz |
| 10,364,872 B2 | 7/2019 | Keeney et al. |
| 10,369,885 B2 | 8/2019 | Keeney et al. |
| 10,378,634 B2 | 8/2019 | Kluck et al. |
| 10,513,146 B2 * | 12/2019 | Eschenburg ............ B60K 17/02 |
| 10,539,218 B2 | 1/2020 | Annigeri et al. |
| 10,703,202 B2 | 7/2020 | Funderburg et al. |
| 11,708,884 B2 * | 7/2023 | Ullagaddi ............ B60K 17/344 |
| | | 475/230 |
| 2016/0341292 A1 | 11/2016 | Hirao |
| 2021/0291644 A1 | 9/2021 | Hayes et al. |
| 2022/0048318 A1 | 2/2022 | Shah et al. |

FOREIGN PATENT DOCUMENTS

| | | | |
|---|---|---|---|
| EP | 3925811 A1 * | 12/2021 | ........... B60K 17/043 |
| FR | 2095933 A5 * | 2/1972 | |
| GB | 1443880 A * | 7/1976 | ......... B60B 27/0047 |
| WO | 2021072518 A1 | 4/2021 | |

* cited by examiner

AXLE ASSEMBLY HAVING A WHEEL END ASSEMBLY AND A GEAR REDUCTION UNIT

TECHNICAL FIELD

This relates to an axle assembly that has a wheel end assembly that includes a gear reduction unit.

BACKGROUND

A wheel end assembly is disclosed in U.S. Patent Publication No. 2022/0048318.

SUMMARY

In at least one embodiment, an axle assembly is provided. The axle assembly includes a spindle, an axle shaft, and a wheel end assembly. The spindle defines a spindle hole. The axle shaft extends through the spindle hole. The axle shaft is rotatable about an axis. The wheel end assembly includes a hub, a hub cap, and a gear reduction unit. The hub is rotatable about the axis with respect to the spindle. The hub cap is rotatable about the axis with the hub. The gear reduction unit includes a first side gear, a second side gear, a case, a pinion pin, and a pinion gear. The first side gear is rotatable about the axis with the axle shaft. The second side gear is fixedly disposed on the spindle. The case is rotatable about the axis with the hub and separates the hub from the hub cap. The pinion pin extends from the case and is spaced apart from the hub. The pinion gear is rotatably disposed on the pinion pin and is received inside the case. The pinion gear meshes with the first side gear and the second side gear.

The case may include an inner ring. The inner ring may encircle the axis. The case may include an outer ring the outer ring may be spaced apart from the inner ring. The case may include a rib. The rib may extend from the inner ring to the outer ring.

The inner ring may encircle the axle shaft. The inner ring may be spaced apart from the hub. The inner ring may be spaced apart from the axle shaft. The inner ring may define an inner ring hole. The inner ring hole may extend along the axis. The inner ring may define a socket. The socket may be disposed opposite the inner ring hole. The pinion pin may be received inside the socket.

The socket may be at least partially defined by a socket bottom surface. A first end surface of the pinion pin may contact the socket bottom surface. The socket may be at least partially defined by a socket side surface that extends from the socket bottom surface. The socket side surface may extend from the socket bottom surface in a direction that extends away from the axis. A socket top surface may extend from the socket side surface.

The outer ring may encircle the inner ring. The outer ring may have a greater axial length in a direction that extends along the axis than the inner ring. The outer ring may define a pinion pin hole. The pinion pin may be received inside the pinion pin hole.

The outer ring may define a support side. The support side may face toward the axis. The support side may encircle the pinion pin hole.

The outer ring may define a retainer hole. The retainer hole may receive a retainer pin. The retainer pin may extend into the pinion pin to inhibit movement of the pinion pin with respect to the case.

An outer washer may extend from the support side toward the pinion gear. The outer washer may have an outer washer flange. The outer washer flange may be encircled by the thrust bearing. The outer washer flange may engage a bearing element that rotatably supports the pinion gear on the pinion pin.

A thrust bearing may encircle the pinion pin. The thrust bearing may extend from the outer washer to the pinion gear.

An inner washer may extend between the socket top surface and the pinion gear.

The gear reduction unit may include a hub cap. The case may extend from the hub cap to the hub. The hub cap and the case may be mounted to the hub.

In at least one configuration, an axle assembly is provided. The axle assembly includes a spindle, an axle shaft, and a wheel end assembly. The spindle defines a spindle hole. The axle shaft extends through the spindle hole. The axle shaft is rotatable about an axis. The wheel end assembly includes a hub and a gear reduction unit. The hub is rotatable about the axis with respect to the spindle. The gear reduction unit includes a first side gear, a second side gear, a case, a set of pinion pins, and a set of pinion gears. The first side gear is rotatable about the axis with the axle shaft. The second side gear is fixedly disposed on the spindle. The case is rotatable about the axis with the hub. The case includes an inner ring, an outer ring, and a set of ribs. The inner ring encircles the axle shaft. The inner ring defines a set of sockets the face away from the axle shaft. The outer ring encircles and is spaced apart from the inner ring. The outer ring defines a set of pinion pin holes. The set of ribs extend from the inner ring to the outer ring. Members of the set of sockets and the set of ribs are arranged such that each member of the set of sockets is positioned between two adjacent members of the set of ribs in a direction that extends around the axis. Each pinion pin is received in a corresponding member of the set of sockets and a corresponding member of the set of pinion pin holes. Each pinion gear is rotatable with respect to a corresponding pinion pin and meshes with the first side gear and the second side gear.

The case defines a plurality of cavities. Each cavity may receive at least one member of the set of pinion gears. For instance, each cavity may receive one member of the set of pinion gears. Each cavity is bounded by the inner ring, the outer ring, and two members of the set of ribs.

Each member of the set of ribs may be disposed substantially perpendicular to the axis. At least one member of the set of ribs may be coaxially disposed with one other member of the set of ribs.

DETAILED DESCRIPTION

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
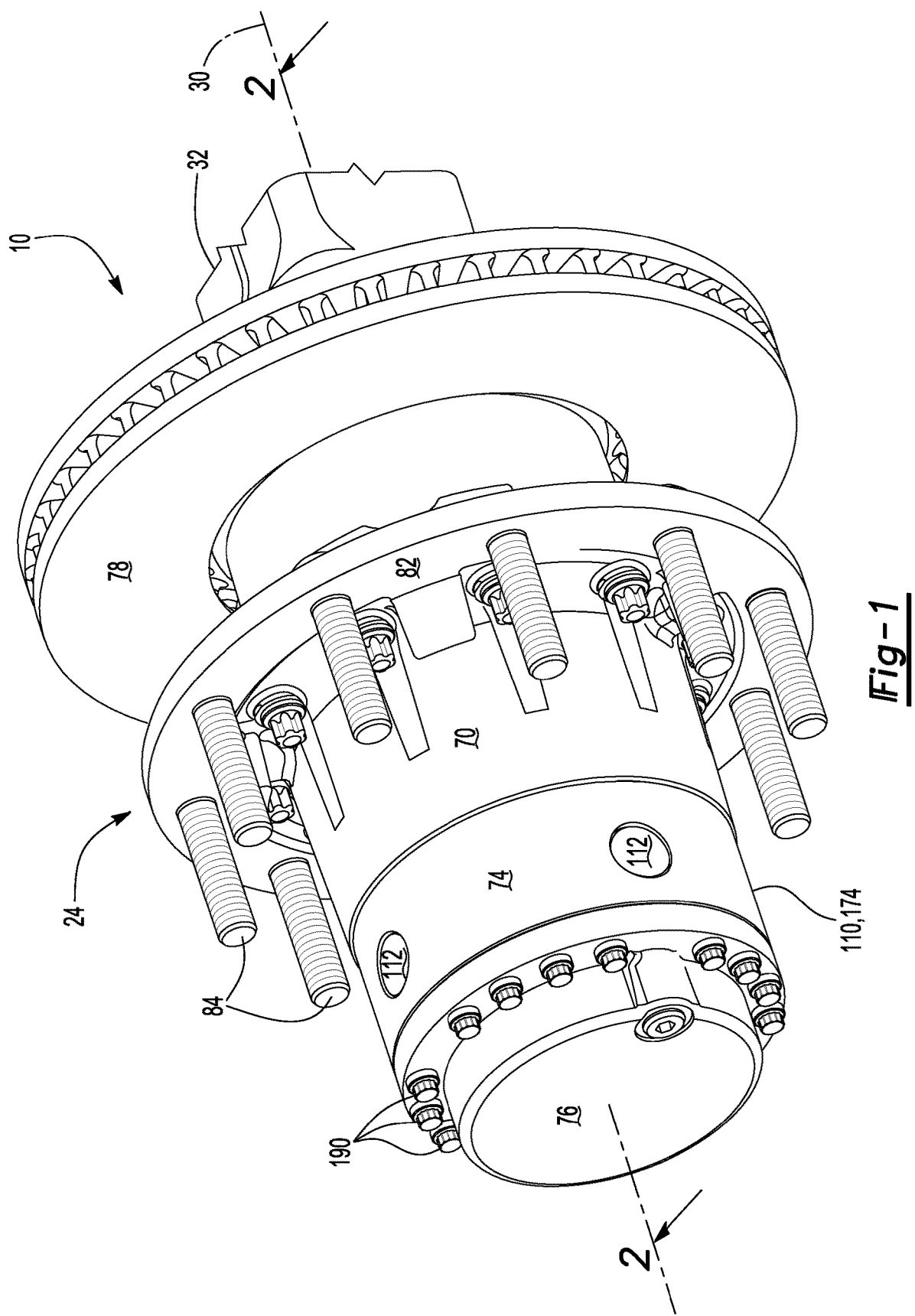
FIG. 1 is a perspective view of an example of a portion of an axle assembly that includes a wheel end assembly.

Referring to FIG. 1, an example of a portion of an axle assembly 10 is shown. The axle assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments. In at least one configuration and as is best shown with reference to FIG. 2, the axle assembly 10 includes a spindle 20, an axle shaft 22, and a wheel end assembly 24.

Figure 2:
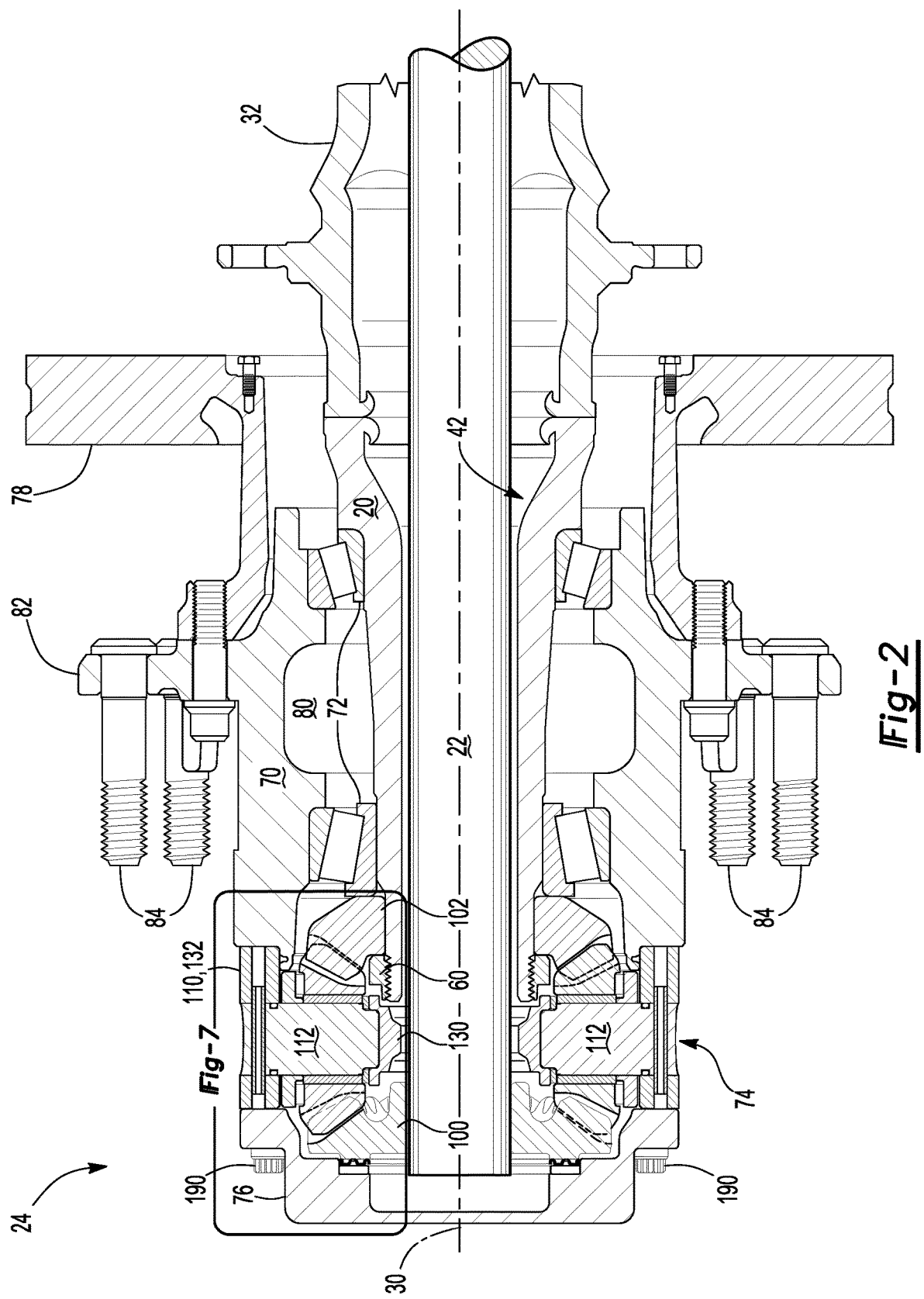
FIG. 2 is a section view of the wheel end assembly along section line 2-2.
Figure 3:
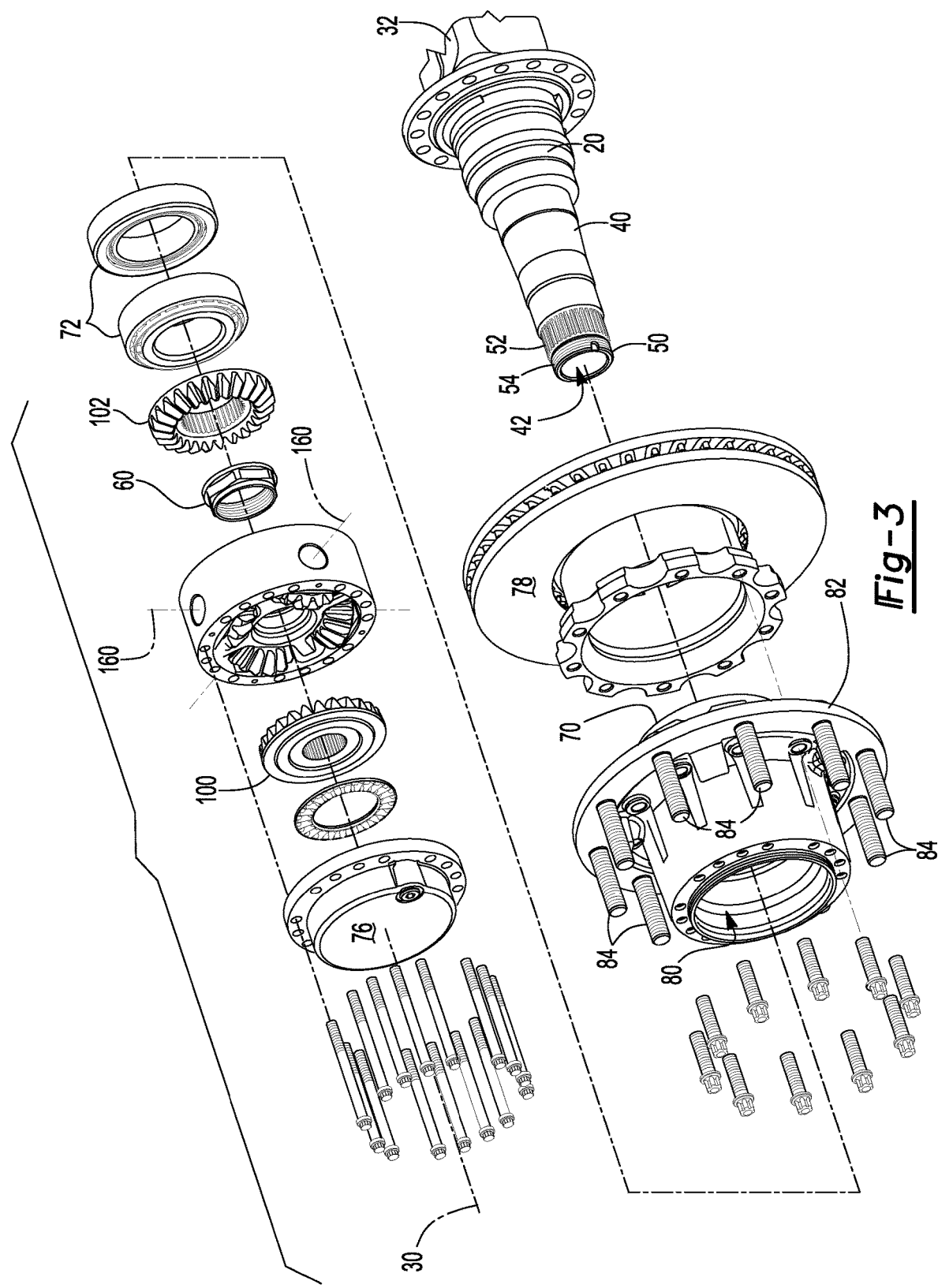
FIGS. 3 and 4 are exploded views of the wheel end assembly.

Referring to FIGS. 2 and 3, the spindle 20 extends along or around an axis 30 and is configured to support components of the wheel end assembly 24. The spindle 20 may be fixedly mounted to a structural component 32 of the axle assembly. For instance, in a steerable configuration, the wheel end assembly 24 may be mounted to a steerable structural component, such as a steering knuckle. In a non-steerable configuration, the wheel end assembly 24 may be mounted to a non-steerable structural component, such as a non-rotatable knuckle or an axle housing. The term axle assembly is used herein to generically reference both steerable and non-steerable configurations; however, the axle assembly 10 will primarily be described in the context of a non-steerable configuration in which the spindle 20 is mounted to a structural component 32 that is an axle housing. The spindle 20 may be integrally formed with the structural component 32 or may be a separate part that is attached to the structural component. In at least one configuration, the spindle 20 may include a tubular portion 40 and may define a spindle hole 42.

Referring primarily to FIG. 3, the tubular portion 40 may encircle the axis 30. In at least one configuration, the tubular portion 40 may have an end portion 50.

The end portion 50 may be disposed at a distal end of the tubular portion 40. The end portion 50 may be configured to support the gear reduction unit 74. In at least one configuration, the end portion 50 may include a mounting feature 52 and a threaded portion 54.

The mounting feature 52 may facilitate mounting of a second side gear 102 of the gear reduction unit 74 to the spindle 20. The mounting feature 52 may have any suitable configuration. For instance, the mounting feature 52 may be a fastener, weld, a plurality of splines that may be arranged around the axis 30 and that may engage and may inhibit rotation of the second side gear 102, or the like.

The threaded portion 54 may be axially positioned or positioned along the axis 30 between a distal end of the end portion 50 and the mounting feature 52. The threaded portion 54 may face away from the axis 30 and may engage or mate with a thread of a nut 60. The nut 60 may be threaded onto the threaded portion 54 and may inhibit axial movement of the second side gear 102 toward the distal end. In addition, the nut 60 may exert a preload force on a wheel bearing 72.

The spindle hole 42 may be a through hole that may extend through the spindle 20. The spindle hole 42 extends along the axis 30 and may be encircled by the tubular portion 40.

Referring to FIG. 2, the axle shaft 22 is rotatable about the axis 30. The axle shaft 22 may provide torque to the wheel end assembly 24. For instance, the axle shaft 22 may be operatively connected at a first end to a vehicle drivetrain component, such as a differential or vehicle power source, and may be coupled to or operatively connected to the wheel end assembly 24 at a second end. For example, the axle shaft 22 may extend through the spindle hole 42 to a gear reduction unit 74 of the wheel end assembly 24 as will be discussed in more detail below. It is also contemplated that the axle shaft 22 may be configured for use with an independent suspension system and may have multiple shaft segments and/or joints that may facilitate relative movement between the first end and the wheel end assembly 24.

The wheel end assembly 24 is configured to support a vehicle wheel. In at least one configuration and as is best shown with reference to FIG. 2, the wheel end assembly 24 includes a hub 70, at least one wheel bearing 72, and a gear reduction unit 74. The wheel end assembly 24 may also include a hub cap 76 and a brake component 78.

Referring to FIGS. 1 and 2, the hub 70 is rotatable about the axis 30 with respect to the spindle 20. In addition, the hub 70 is configured to facilitate mounting of a wheel. The hub 70 may be operatively connected to an axle shaft 22. In at least one configuration, the hub 70 may include a hub cavity 80 and a hub mounting flange 82.

Referring primarily to FIGS. 2 and 3, the hub cavity 80 may extend around the axis 30. The hub cavity 80 may receive at least a portion of various components of the wheel end assembly 24, such as the spindle 20, wheel bearings 72, and optionally a portion of the gear reduction unit 74.

The hub mounting flange 82 may facilitate mounting of the wheel. For example, the hub mounting flange 82 may extend away from the axis 30 and may include a set of holes that may each receive a lug bolt 84. A lug bolt 84 may extend through a corresponding hole in the wheel. A lug nut may be threaded onto a lug bolt 84 to secure the wheel to the hub 70.

Referring primarily to FIG. 2, one or more wheel bearings 72 may be disposed on the spindle 20. A wheel bearing rotatably supports the hub 70. In the configuration shown, two wheel bearings 72 are depicted. A wheel bearing 72 may have any suitable configuration. For instance, the wheel bearing 72 may include a plurality of rolling elements, such as balls or rollers, that may be disposed between an inner race and an outer race. The inner race may encircle the spindle 20. The outer race may engage the hub 70 and may encircle the inner race and the rolling elements.

Figure 4:
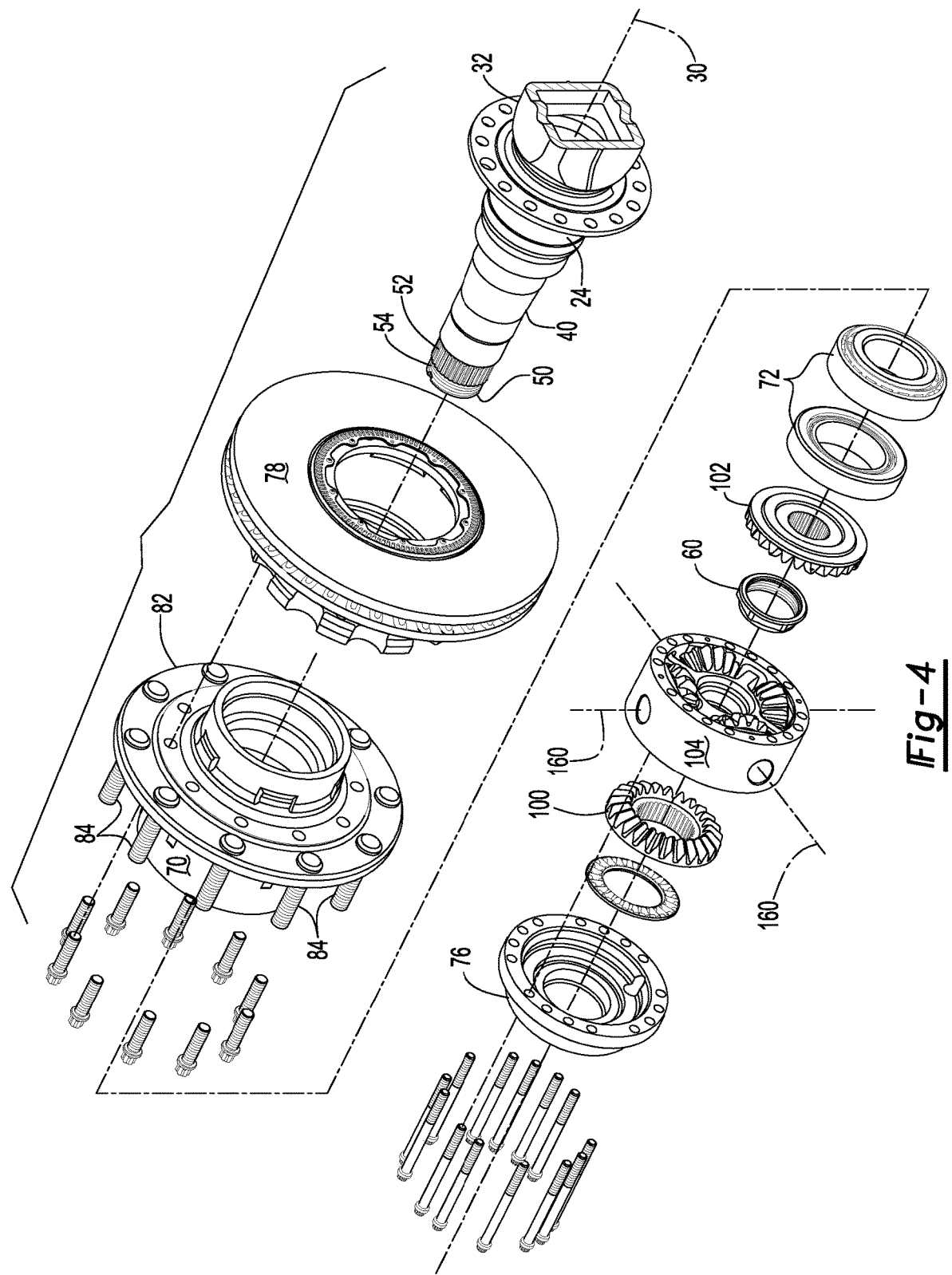
Figure 5:
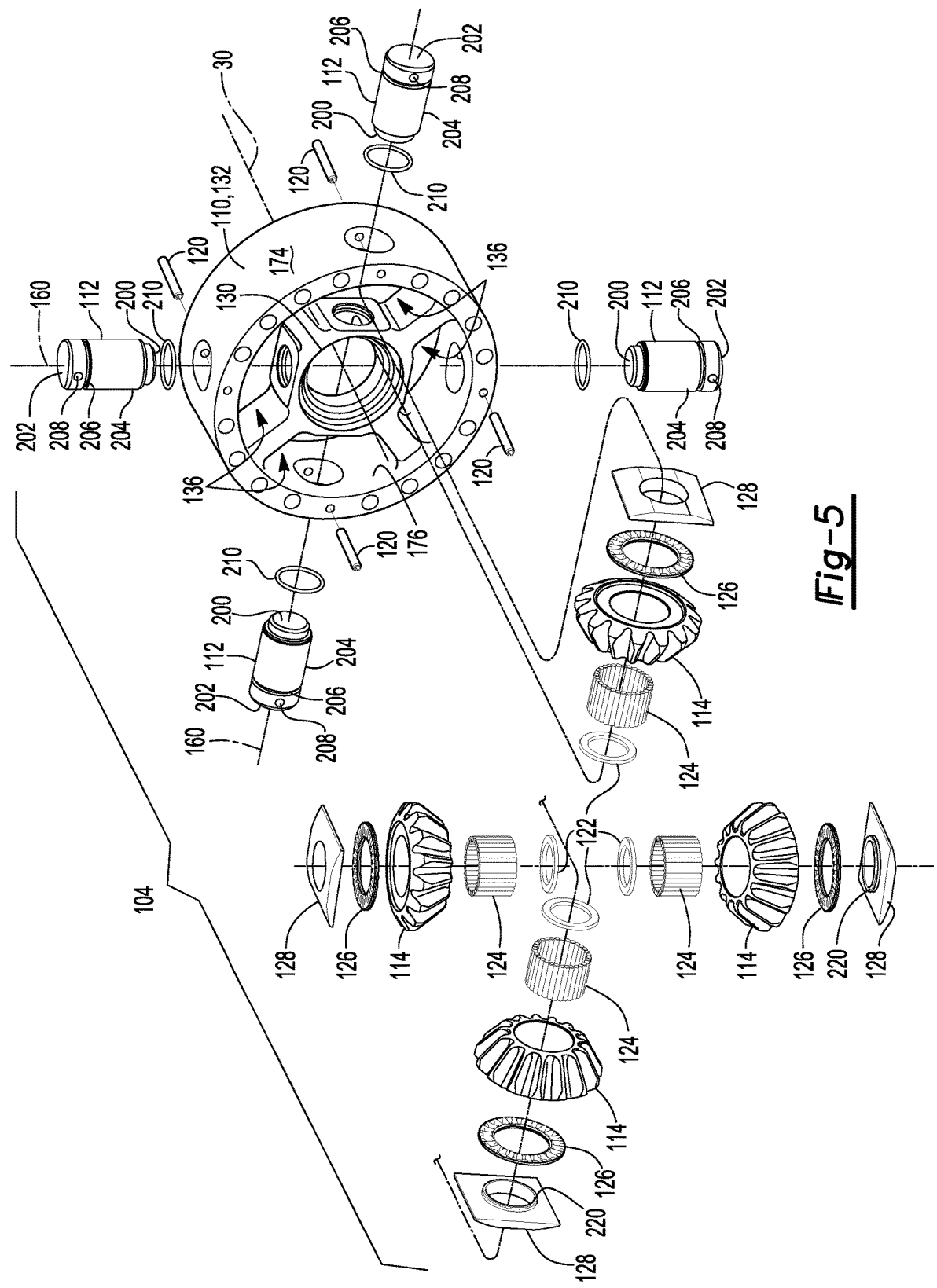
FIG. 5 is an exploded view of a gear nest of a gear reduction unit of the wheel end assembly.

The gear reduction unit 74 operatively connects the axle shaft 22 to the hub 70. The gear reduction unit 74 transmits torque from the axle shaft 22 to the hub 70. It is contemplated that the gear reduction unit 74 or a portion thereof may be disposed inside the hub 70. In at least one configuration and as is best shown in FIGS. 3 and 4, the gear reduction unit 74 includes a first side gear 100, a second side gear 102, and a gear nest 104. As is best shown in FIG. 5, the gear nest 104 may include a case 110, at least one pinion pin 112, and at least one pinion gear 114. Additionally, one or more retainer pins 120, inner washers 122, bearing elements 124, thrust bearings 126, outer washers 128, or combinations thereof may be provided with the gear nest 104.

Referring to FIGS. 2-4 and 7, the first side gear 100 is shown. The first side gear 100 is disposed inside the wheel end assembly 24 and is disposed between the hub cap 76 and the case 110. As such, a portion of the first side gear 100 may be received inside the hub cap 76 or may be encircled by the hub cap 76. In addition, the first side gear 100 may be disposed further outboard or closer to the hub cap 76 than the second side gear 102. The first side gear 100 may be fixedly disposed on the axle shaft 22. For instance, the first side gear 100 may have a hole that may receive the axle shaft 22 such that the first side gear 100 is rotatable with the axle shaft 22. For example, the first side gear 100 may be fastened to the axle shaft 22 or may have a spline that mates with a corresponding spline on the axle shaft 22 such that the first side gear 100 may not rotate with respect to the axle shaft 22. The first side gear 100 may also have a set of teeth that may face toward and may be spaced apart from the case 110. The set of teeth that may be arranged around the axis 30 and that may mate or mesh with teeth on one or more pinion gears 114. The set of teeth may be at least partially disposed outside the case 110.

The second side gear 102 is fixedly disposed on the spindle 20 or fixedly positioned with respect to the spindle 20. The second side gear 102 may be disposed inside the wheel end assembly 24. For example, the second side gear 102 may be disposed on an opposite side of the case 110 with respect to the first side gear 100. The second side gear 102 may be disposed between the case 110 and the wheel bearing 72. The second side gear 102 may be fixedly disposed on the spindle 20 in any suitable manner. For instance, the second side gear 102 may be attached with a fastener or weld or may have a hole that receive the spindle 20 such that the second side gear 102 may be fixed to the spindle 20. For example, the second side gear 102 may have a spline that mates with a corresponding spline on the spindle 20 such that the second side gear 102 does not rotate with respect to the spindle 20. The second side gear 102 may also have a set of teeth that may face toward and may be spaced apart from the case 110. The set of teeth may be arranged around the axis 30 and may mate or mesh with teeth on one or more pinion gears 114.

Referring primarily to FIGS. 2 and 5-7, the case 110 may receive components of the gear nest 104 of the gear reduction unit 74. For instance, the case 110 may receive and support the pinion pins 112, pinion gears 114, retainer pins 120, inner washers 122, bearing elements 124, thrust bearings 126, outer washers 128, or combinations thereof. It is contemplated that the case 110 may be a single unitary one-piece component rather than an assembly of multiple parts. The case 110 may be fixedly positioned with respect to the hub 70 and may be rotatable about the axis 30 with the hub 70. In at least one configuration and as is best shown with reference to FIG. 6, the case 110 may include an inner ring 130, an outer ring 132, and one or more ribs 134. In addition, the case 110 may define a plurality of cavities 136.

Figure 6:
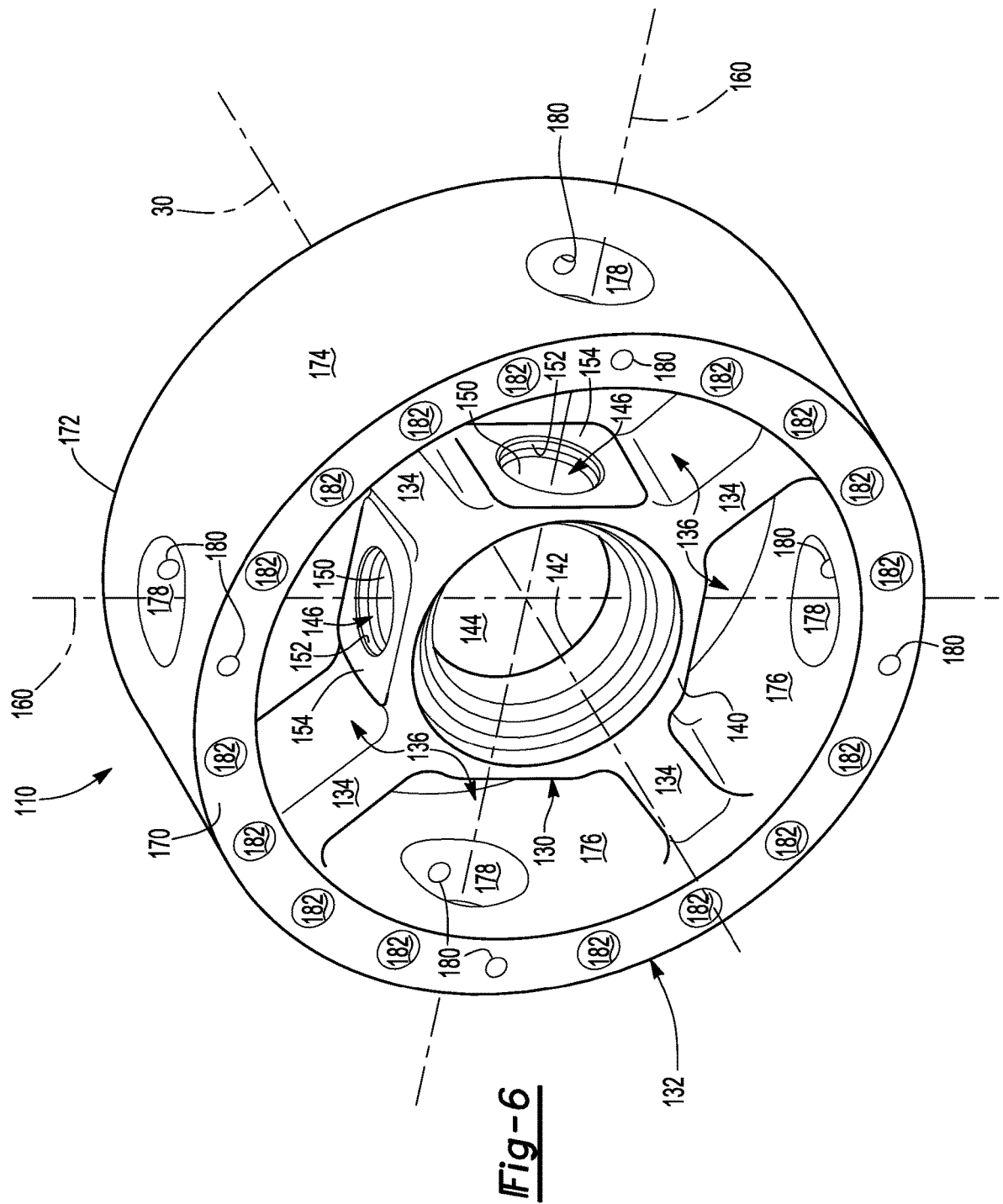
FIG. 6 is a perspective view of a case of the gear nest of the gear reduction unit.

Referring primarily to FIGS. 2, 5, and 6, the inner ring 130 may extend around or encircle the axle shaft 22 and the axis 30. In addition, the inner ring 130 may be spaced apart from and may not contact the axle shaft 22. In at least one configuration and as is best shown in FIG. 6, the inner ring 130 may have a first inner ring end 140 and a second inner ring end 142 and may define an inner ring hole 144, and at least one socket 146.

Figure 7:
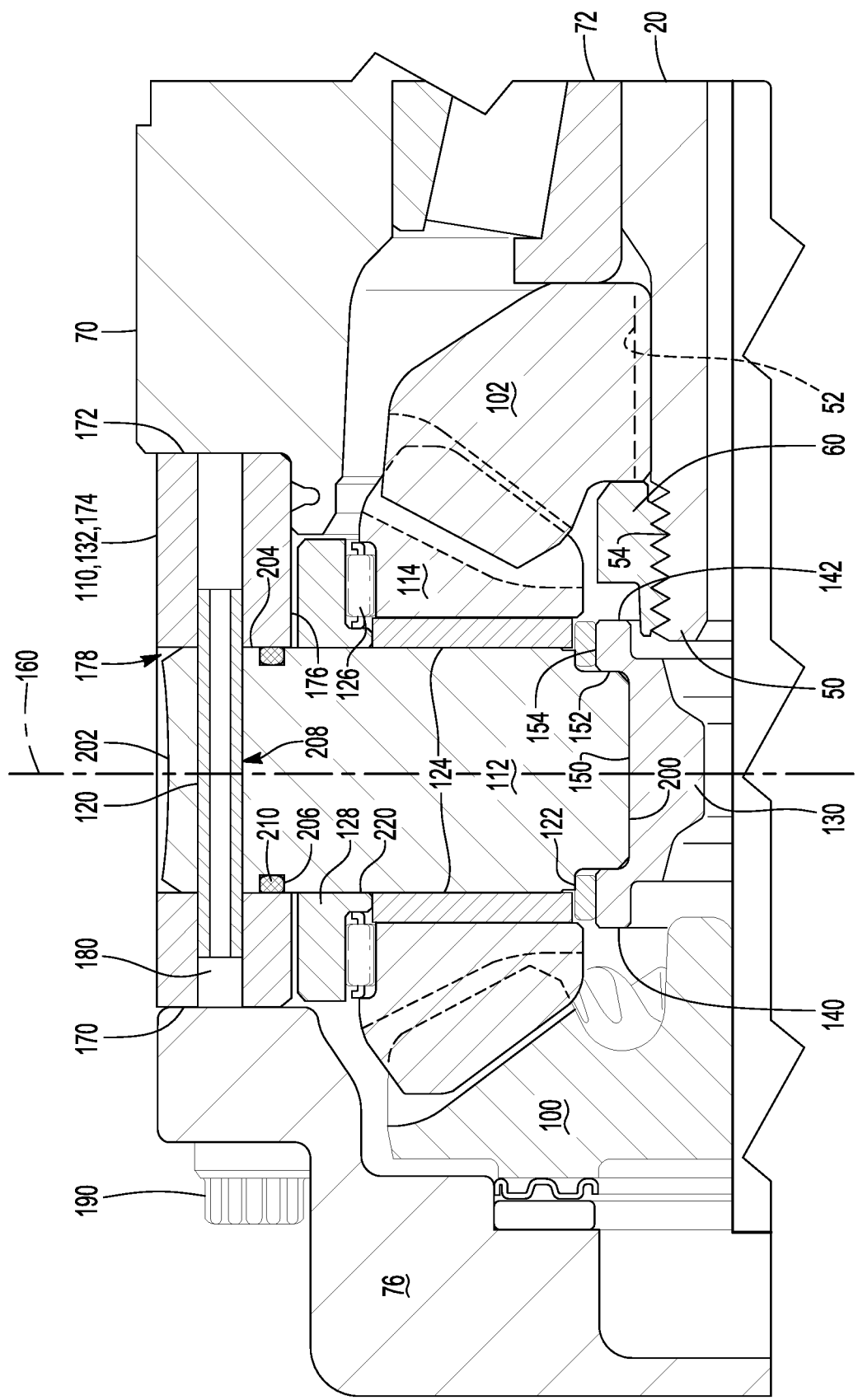
FIG. 7 is a magnified view of a portion of FIG. 2

The first inner ring end 140 may face toward the first side gear 100 or to the left from the perspective shown in FIG. 7. The first inner ring end 140 may extend around or encircle the axis 30.

The second inner ring end 142 may be disposed at an opposite end of the inner ring 130 from the first inner ring end 140. As such, the second inner ring end 142 may face away from the first side gear 100 and may face toward the second side gear 102 or to the right from the perspective shown in FIG. 7. The second inner ring end 142 may extend around or encircle the axis 30.

Referring primarily to FIG. 6, the inner ring hole 144 may extend along or around the axis 30. The inner ring hole 144 may extend between the first inner ring end 140 and the second inner ring end 142. For instance, the inner ring hole 144 may extend from the first inner ring end 140 to the second inner ring end 142. The axle shaft 22, which is best shown in FIG. 2, may be received inside and may extend through the inner ring hole 144.

Referring primarily to FIG. 6, a set of one or more sockets 146 may be provided with the inner ring 130. A socket 146 may be disposed opposite the inner ring hole 144 and may face away from the axis 30. The socket 146 may be configured to receive a corresponding pinion pin 112 as will be discussed in more detail below. In at least one configuration and as is best shown with reference to FIGS. 6 and 7, the socket 146 may be at least partially defined by a socket bottom surface 150, a socket side surface 152, and a socket top surface 154.

The socket bottom surface 150 may be disposed at the bottom of the socket 146. As such, the socket bottom surface 150 may be disposed closer to the axis 30 than the socket side surface 152, the socket top surface 154, or both. The socket bottom surface 150 may be spaced apart from the first inner ring end 140, the second inner ring end 142, and the inner ring hole 144. The socket bottom surface 150 may be disposed further from the axis 30 than the inner ring hole 144 is disposed from the axis 30 and may extend substantially parallel to the axis 30 in one or more configurations. The term "substantially parallel" as used herein means the same as or very close to parallel and includes features or axes that are within ±3° of being parallel each other. The socket bottom surface 150 may engage or contact the pinion pin 112 to limit or inhibit movement of a pinion pin 112 toward the axis 30.

The socket side surface 152 may extend from the socket bottom surface 150 in a direction that extends away from the axis 30. For instance, the socket side surface 152 may extend from the socket bottom surface 150 to the socket top surface 154. The socket side surface 152 may encircle the socket bottom surface 150 and may encircle a portion of a pinion pin 112 that is received in the socket 146. In at least one configuration, the socket side surface 152 may be radially disposed with respect to an associated center axis 160. The center axis 160 may be disposed substantially perpendicular to the axis 30. The term "substantially perpendicular" is used herein to designate features or axes that are the same as or very close to perpendicular and includes features that are within ±3° of being perpendicular each other.

The socket top surface 154 may extend from the socket side surface 152 in a direction that extends away from the center axis 160. The socket top surface 154 may be disposed further from the axis 30 than the socket bottom surface 150 is disposed from the axis 30. The socket top surface 154 may encircle the socket side surface 152. In at least one configuration, the socket top surface 154 may be spaced apart from and may not engage a corresponding pinion pin 112.

The outer ring 132 may encircle the inner ring 130. As such, the outer ring 132 may be disposed further from the axis 30 than the inner ring 130 is disposed from the axis 30. In addition, the outer ring 132 may be spaced apart from the inner ring 130 and the axle shaft 22. In at least one configuration, the outer ring 132 may define a first outer ring end 170, a second outer ring end 172, an outer side 174, at least one support side 176, at least one pinion pin hole 178, at least one retainer hole 180, at least one fastener hole 182, or combinations thereof.

The first outer ring end 170 may face toward the first side gear 100 or to the left from the perspective shown in FIG. 7. The first outer ring end 170 may extend around and may encircle the axis 30. The first outer ring end 170 may be disposed further from the axis 30 than the first inner ring end 140 is disposed from the axis 30.

The second outer ring end 172 may be disposed at an opposite end of the outer ring 132 from the first outer ring end 170. As such, the second outer ring end 172 may face away from the first side gear 100 and may face toward the second side gear 102, or to the right from the perspective shown in FIG. 7. The second outer ring end 172 may extend around and may encircle the axis 30. In at least one configuration, the second outer ring end 172 may be disposed further from the axis 30 than the second inner ring end 142 is disposed from the axis 30. As such, the outer ring 132 may have a greater axial length or length in a direction that extends along or parallel to the axis 30 than the inner ring 130.

Referring primarily to FIG. 6, the outer side 174 may face away from the axis 30 and may extend around the axis 30. In addition, the outer side 174 may extend between the first outer ring end 170 and the second outer ring end 172. For instance, the outer side 174 may extend from the first outer ring end 170 to the second outer ring end 172. The outer side 174 may be an exterior surface of the wheel end assembly 24 as is best shown in FIG. 1.

Referring to FIGS. 6 and 7, at least one support side 176 may be provided with the outer ring 132. The support side 176 may face toward the axis 30 and the inner ring 130. As such, the support side 176 may be disposed opposite the outer side 174. In addition, the support side 176 may extend between the first outer ring end 170 and the second outer ring end 172. For instance, the support side 176 may extend axially from the first outer ring end 170 to the second outer ring end 172. A support side 176 may encircle a pinion pin hole 178. In the configuration shown, four support sides 176 are illustrated; however, it is contemplated that a greater or lesser number of support sides 176 may be provided. The support sides 176 may be separated or partially separated from each other. For instance, a rib 134 may be disposed between adjacent support sides 176 and may help separate one support side 176 from an adjacent support side 176. In at least one configuration, each support side 176 extends along an arc; however, it is contemplated that a planar or non-arcuate configuration may be provided.

A set of one or more pinion pin holes 178 may be defined by the outer ring 132. A pinion pin hole 178 may receive a pinion pin 112. The pinion pin hole 178 may extend from the support side 176 toward or to the outer side 174. Each pinion pin hole 178 may extend along a corresponding center axis 160 and may be aligned with a corresponding socket 146.

The retainer hole 180 may extend from a pinion pin hole 178 to the first outer ring end 170, the second outer ring end 172, or both. The retainer hole 180 may be positioned closer to the axis 30 than the outer side 174 is positioned to the axis 30 and may be positioned further from the axis 30 than the support side 176 is positioned from the axis 30. In at least one configuration, the retainer hole 180 may be disposed substantially parallel to the axis 30. The retainer hole 180 may receive a retainer pin 120 that may engage and may extend into the pinion pin 112 to inhibit movement of the pinion pin 112 with respect to the case 110. The retainer pin 120 may have any suitable configuration. For instance, the retainer pin 120 may be configured as a shaft or pin like a roll pin.

One or more fastener holes 182 may extend from the first outer ring end 170 toward or to the second outer ring end 172. A fastener hole 182 may be configured to receive a fastener 190 that may couple or secure the case to the hub 70, the hub cap 76, or both. Examples of fasteners 190 are best shown in FIGS. 3 and 4. One or more fastener holes 182 may be unthreaded.

Referring primarily to FIG. 6, a set of one or more ribs 134 may connect the inner ring 130 to the outer ring 132. A rib 134 may extend in a direction that extends away from the axis 30 from the inner ring 130 to the outer ring 132. In at least one configuration, each member of the set of ribs 134 may be disposed substantially perpendicular to the axis 30. Optionally, a member of the set of ribs 134 may be aligned with or may be coaxially disposed with one other member of the set of ribs 134 that is disposed on an opposite side of the axis 30 and inner ring 130. A rib 134 may be integrally formed with the inner ring 130, the outer ring 132, or both. In the configuration shown, four ribs 134 are illustrated; however, it is contemplated that a greater or lesser number of ribs may be provided. Each rib 134 may be spaced apart from the sockets 146 of the inner ring 130, the support side 176 of the outer ring 132, or both. A rib 134 may have a shorter axial length or length in a direction that extends along the axis 30 than the inner ring 130, the outer ring 132, or both. For instance, a rib 134 may be spaced apart from the first outer ring end 170, the second outer ring end 172, or both. In such a configuration, the outer ring 132 may have a greater axial length or length in a direction that extends along the axis 30 than the rib 134.

In at least one configuration and as is best shown with reference to FIG. 6, the case 110 may define a plurality of cavities 136 when two or more ribs 134 are provided. Each cavity 136 may be bounded by the inner ring 130, the outer ring 132, and two members of the set of ribs 134. Each cavity 136 may receive at least one pinion pin 112 and at least one pinion gear 114. In the configuration shown in FIG. 7, each cavity 136 receives one pinion pin 112 and one pinion gear 114. In such a configuration, members of the set of ribs 134 and the set of sockets 146 may be arranged in an alternating relationship such that each member of the set of sockets 146 is positioned between two adjacent members of the set of ribs 134 in a direction that extends around the axis 30.

Referring primarily to FIGS. 6 and 7, a set of one or more pinion pins 112 may the mounted to the case 110. A pinion pin 112 may be a separate component from the case 110 and may extend between the inner ring 130 and the outer ring 132. A pinion pin 112 may be partially received inside a corresponding socket 146 of the inner ring 130 and may be partially received inside a corresponding pinion pin hole 178 of the outer ring 132. Moreover, a pinion pin 112 may be spaced apart from the axle shaft 22 and may not extend into the inner ring hole 144. A pinion pin 112 may have any suitable configuration. In the configuration shown, each pinion pin 112 has a generally cylindrical configuration and extends along a corresponding center axis 160. In at least one configuration, the pinion pin 112 may have a first end surface 200, a second end surface 202, an outer pin side 204, a groove 206, and a retainer pin hole 208.

The first end surface 200 may engage the inner ring 130. For instance, the first end surface 200 may be received inside the socket 146 and engage or contact the socket bottom surface 150.

The second end surface 202 may be disposed opposite the first end surface 200. In at least one configuration, the second end surface 202 may be received inside a pinion pin hole 178 in the outer ring 132.

The outer pin side 204 may extend between the first end surface 200 and the second end surface 202. The outer pin side 204 may face toward and may engage the socket side surface 152, a bearing element 124, a surface that defines the pinion pin hole 178, or combinations thereof.

The groove 206 may extend from the outer pin side 204 toward a corresponding center axis 160. The groove 206 may receive a seal 210, such as an O-ring, and may be axially positioned such that the groove 206 and the seal 210 are received in a pinion pin hole 178 in the outer ring 132. The seal 210 may inhibit water and other contaminants from passing through the pinion pin hole 178 and entering the wheel end assembly 24.

The retainer pin hole 208 may extend from the outer pin side 204. The retainer pin hole 208 may be aligned with the retainer hole 180 of the outer ring 132. The retainer pin 120 may be received in the retainer hole 180 of the outer ring 132 and the retainer pin hole 208 of the pinion pin 112 to secure the pinion pin 112 and inhibit removal of the pinion pin 112 from the retainer hole 180. As such, the pinion pin 112 may be mounted to the case 110 such that the pinion pin 112 is rotatable about the axis 30 with the case 110.

Referring primarily to FIGS. 5 and 7, a set of one or more pinion gears 114 are provided with the gear nest 104. Each pinion gear 114 may be rotatable with respect to the case 110 and with respect to a corresponding pinion pin 112. For instance, the pinion gear 114 may define a hole that may receive a corresponding pinion pin 112 in a manner that permits the pinion gear 114 to rotate about the pinion pin 112 and a corresponding center axis 160. The pinion gear 114 may mesh with the first side gear 100 and the second side gear 102. For instance, the pinion gear 114 may include teeth that may mesh or mate with the teeth of the first side gear 100 and may mesh or mate with teeth of the second side gear 102.

An inner washer 122 may be provided between the inner ring 130 and a pinion pin 112. For instance, the inner washer 122 may encircle the pinion pin 112 and may extend from the socket top surface 154 to or toward the pinion pin 112. The inner washer 122 may also engage and limit axial movement of the bearing elements 124.

One or more bearing elements 124 may rotatably support the pinion gear 114 on a pinion pin 112. The bearing elements 124 may be received in the hole of the pinion gear 114 and may be arranged around the pinion pin 112 and a corresponding center axis 160. The bearing elements 124 may have any suitable configuration. For instance, the bearing elements 124 may be configured as needle bearings.

A thrust bearing 126 may be provided between a pinion gear 114 and the outer ring 132. For instance, a thrust bearing 126 may encircle the pinion pin 112 and may engage or contact the pinion gear 114. The thrust bearing 126 may cooperate with the bearing elements 124 to facilitate rotation of the pinion gear 114.

An outer washer 128 may be provided between a pinion gear 114 and the outer ring 132. For instance, an outer washer 128 may encircle the pinion pin 112 and may extend from the thrust bearing 126 to a corresponding support side 176 of the outer ring 132. The outer washer 128 may also include an outer washer flange 220 that may extend toward and may engage the bearing elements 124. The outer washer flange 220 may be encircled by the thrust bearing 126.

Referring to FIGS. 1, 2, and 7, the hub cap 76 encloses an outboard end of the wheel end assembly 24. The hub cap 76 may be mounted to the hub 70 and the gear reduction unit 74. For example, the hub cap 76 may be attached to the case 110 of the gear reduction unit 74 and may be disposed opposite and may be spaced apart from the hub 70. In at least one configuration, one or more fasteners 190, such as bolts, may secure the hub cap 76 to the hub 70, the gear reduction unit 74, or both. As an example, a fastener 190 may extend through a hole in the hub cap 76, through a fastener hole in the case 110, and may be threaded into a corresponding fastener hole in the hub 70.

Referring to FIGS. 1 and 2, the brake component 78 is fastened to the hub 70. The brake component 78 may have any suitable configuration. For instance, the brake component 78 may be configured as a brake rotor or a brake drum.

An axle assembly as described above allows a gear reduction unit to be provided without a spider, such as a spider that has a central ring that encircles an axis of rotation and has one or more shafts or pins that may be integrally formed with the central ring, extend away from the axis of rotation, and about which a pinion gear may rotate. Eliminating a spider with integrally-formed pins may prevent a pin from fracturing and/or separating from the central ring, the case of the gear reduction unit, or both, which in turn may improve the durability of the gear reduction unit. In addition, such a configuration may allow a gear reduction unit to be provided with fewer parts than gear reduction unit designs that have a spider, which may help reduce assembly time of the gear reduction unit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a spindle that defines a spindle hole;
an axle shaft that extends through the spindle hole and is rotatable about an axis; and
a wheel end assembly that includes:
a hub that is rotatable about the axis with respect to the spindle;

a hub cap that is rotatable about the axis with the hub; and
a gear reduction unit that includes:
a first side gear that is rotatable about the axis with the axle shaft;
a second side gear that is fixedly disposed on the spindle;
a case that is rotatable about the axis with the hub and that separates the hub from the hub cap, wherein the case includes an inner ring that encircles the axis, an outer ring that is spaced apart from the inner ring and that defines a retainer hole, and a rib that extends from the inner ring to the outer ring;
a pinion pin that extends from the case and that is spaced apart from the hub;
a retainer pin that is received in the retainer hole and extends into the pinion pin to inhibit movement of the pinion pin with respect to the case; and
a pinion gear that is rotatably disposed on the pinion pin and received inside the case, wherein the pinion gear meshes with the first side gear and the second side gear.

2. The axle assembly of claim 1 wherein the case extends from the hub cap to the hub and the hub cap and the case are mounted to the hub.

3. The axle assembly of claim 1 wherein the inner ring encircles the axle shaft and the outer ring encircles the inner ring.

4. The axle assembly of claim 1 wherein the inner ring is spaced apart from the hub and the axle shaft.

5. The axle assembly of claim 1 wherein the outer ring has a greater axial length in a direction that extends along the axis than the inner ring.

6. The axle assembly of claim 1 wherein the outer ring defines a pinion pin hole and the pinion pin is received inside the pinion pin hole.

7. The axle assembly of claim 1 wherein the inner ring defines an inner ring hole that extends along the axis and a socket that is disposed opposite the inner ring hole, wherein the pinion pin is received inside the socket.

8. The axle assembly of claim 7 wherein the socket is at least partially defined by a socket bottom surface.

9. An axle assembly comprising:
a spindle that defines a spindle hole;
an axle shaft that extends through the spindle hole and is rotatable about an axis; and
a wheel end assembly that includes:
a hub that is rotatable about the axis with respect to the spindle;
a hub cap that is rotatable about the axis with the hub; and
a gear reduction unit that includes:
a first side gear that is rotatable about the axis with the axle shaft;
a second side gear that is fixedly disposed on the spindle;
a case that is rotatable about the axis with the hub and that separates the hub from the hub cap, wherein the case includes an inner ring that encircles the axis, an outer ring that is spaced apart from the inner ring, and a rib that extends from the inner ring to the outer ring;
a pinion pin that extends from the case and that is spaced apart from the hub; and
a pinion gear that is rotatably disposed on the pinion pin and received inside the case, wherein the pinion gear meshes with the first side gear and the second side gear;
wherein the inner ring defines an inner ring hole that extends along the axis and a socket that is disposed opposite the inner ring hole, wherein the pinion pin is received inside the socket and the socket is at least partially defined by a socket bottom surface and a socket side surface that extends from the socket bottom surface in a direction that extends away from the axis.

10. The axle assembly of claim 9 wherein the outer ring defines a retainer hole that receives a retainer pin that extends into the pinion pin to inhibit movement of the pinion pin with respect to the case.

11. The axle assembly of claim 9 wherein the inner ring has a socket top surface that extends from the socket side surface, wherein an inner washer extends between the socket top surface and the pinion gear.

12. The axle assembly of claim 9 wherein a first end surface of the pinion pin contacts the socket bottom surface.

13. The axle assembly of claim 12 wherein the outer ring defines a pinion pin hole that receives the pinion pin and a support side that faces toward the axis and that encircles the pinion pin hole, and wherein an outer washer extends from the support side toward the pinion gear.

14. The axle assembly of claim 13 wherein a thrust bearing encircles the pinion pin and extends from the outer washer to the pinion gear.

15. The axle assembly of claim 14 wherein the outer washer has an outer washer flange that is encircled by the thrust bearing and that engages a bearing element that rotatably supports the pinion gear on the pinion pin.

16. An axle assembly comprising:
a spindle that defines a spindle hole;
an axle shaft that extends through the spindle hole and is rotatable about an axis; and
a wheel end assembly that includes:
a hub that is rotatable about the axis with respect to the spindle; and
a gear reduction unit that includes:
a first side gear that is rotatable about the axis with the axle shaft;
a second side gear that is fixedly disposed on the spindle;
a case that is rotatable about the axis with the hub, the case including:
an inner ring that encircles the axle shaft, the inner ring defining a set of sockets that face away from the axle shaft;
an outer ring that encircles and is spaced apart from the inner ring, the outer ring defining a set of pinion pin holes and a set of retainer pin holes; and
a set of ribs that extends from the inner ring to the outer ring, wherein members of the set of sockets and the set of ribs are arranged such that each member of the set of sockets is positioned between two adjacent members of the set of ribs in a direction that extends around the axis;
a set of pinion pins, wherein each pinion pin is received in a corresponding member of the set of sockets and a corresponding member of the set of pinion pin holes; and
a set of pinion gears, wherein each pinion gear is rotatable with respect to a corresponding pinion pin and meshes with the first side gear and the second side gear, wherein each member of the set of retainer holes receives a corresponding retainer pin that extends into a corresponding member of the set of pinion pins and inhibits movement of the corresponding member of the set of pinion pins with respect to the case.

17. The axle assembly of claim 16 wherein the case defines a plurality of cavities that each receive a member of the set of pinion gears, wherein each cavity is bounded by the inner ring, the outer ring, and two members of the set of ribs.

18. The axle assembly of claim 17 wherein each cavity receives one member of the set of pinion gears.

19. The axle assembly of claim 16 wherein each member of the set of ribs is disposed substantially perpendicular to the axis.

20. The axle assembly of claim 16 wherein at least one member of the set of ribs is coaxially disposed with one other member of the set of ribs.

* * * * *